UNITED STATES PATENT OFFICE.

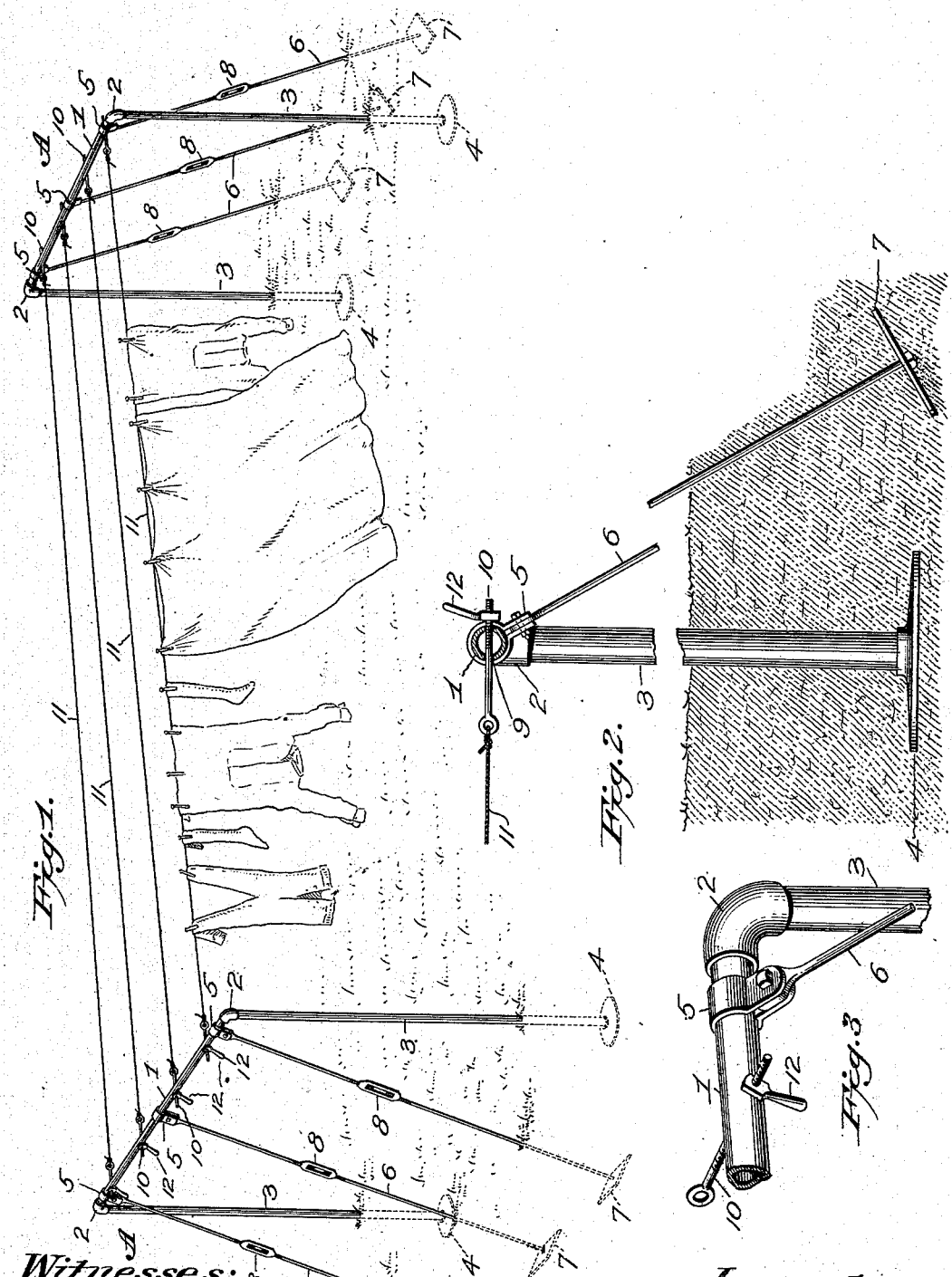

JAMES B. JACKSON, OF DENVER, COLORADO, ASSIGNOR OF ONE-HALF TO JAMES A. McCLURG, OF DENVER, COLORADO.

METALLIC-CLOTHES-LINE SUPPORTER.

SPECIFICATION forming part of Letters Patent No. 714,704, dated December 2, 1902.

Application filed January 6, 1902. Serial No. 88,632. (No model.)

*To all whom it may concern:*

Be it known that I, JAMES B. JACKSON, a citizen of Great Britain, residing at Denver, in the county of Arapahoe and State of Colorado, have invented certain new and useful Improvements in Metallic-Clothes-Line Supporters; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in metallic-clothes-line supporters.

The object of the invention is to produce a clothes-line supporter which is made up of two tubular frames, each presenting a horizontal member and two vertically-depending members, the latter members being securely anchored in the ground and the said frames being held vertical or against movement toward each other by brace-rods, one end of each of which is attached to the horizontal member of the frame, while the opposite end is securely anchored in the ground, the horizontal members being provided with threaded eyebolts, to which the lines are secured, the said eyebolts being provided with tightening means, the parts being made of galvanized iron, all of which will be fully set forth.

The invention consists in the novel arrangement and combination of parts, as will be clearly pointed out in the accompanying specification and claim.

In the accompanying drawings, in which like letters and numerals indicate corresponding parts, Figure 1 is a perspective view of my improved clothes-line supporter, showing the same in operative position. Fig. 2 is a sectional view through one of the frames, showing the manner of anchoring the same. Fig. 3 is a perspective view of a corner of one of the frames, clearly showing one of the clips to which the guy-rods are attached and an eyebolt to which one end of one of the clothes-lines is attached.

Referring to the accompanying drawings, the letter A indicates a tubular frame which is made up to present a horizontal member 1, each end of which is threaded and provided with an elbow 2, into each of which is screwed a tubular section or upright 3, which is provided with an anchor-plate 4 at its extremity. Two of these frames A are used, and as they are identical in construction a description of one will suffice. The sections or uprights 3, carrying the anchor-plates 4, are embedded in the ground a sufficient depth, and the earth is firmly pressed around them. The horizontal member 1 is provided at intervals with clips 5, to which are bolted guy-rods 6, which carry anchor-plates 7 at their lower ends. The guy-rods 6 may lie at any suitable angle, but preferably at an angle of substantially thirty degrees to the uprights 3, and their ends carrying the anchor-plate are embedded in the ground to same depth as the uprights 3, thus securely holding the frame A against movement in direction of the tension exerted against it. The guy-rods 6 are each made up of two sections, as shown, and the opposing ends of these sections are threaded, one with right-hand threads and the other with left-hand threads, and a turnbuckle 8 connects the two sections, thus providing means for securing an even relative tension on the said rods, which otherwise would be impossible. The horizontal member 1 is provided with a plurality of holes 9, which receive eyebolts 10, to the eyes of which the clothes-lines 11 are secured, while their threaded ends receive hand-nuts 12, which when turned upon the eyebolts and against the horizontal member 1 will effect the desired amount of tension on the line 11.

The frames A are anchored in the ground, as clearly shown by Figs. 1 and 2, and the guy-rods 6 are then anchored and the turnbuckles 8 turned, as may be necessary, to secure an even tension on the rods. The eyebolts 10 are then inserted in the holes 9 of the horizontal members 1, and upon their threaded ends are screwed the hand-nuts 12. The clothes-lines are then secured at one end to the eyebolts in one of the frames A and at their other ends to the eyebolts in the other frame, after which the hand-nuts 12 are turned to secure the desired tension, the guy-rods 6 holding the frames A against movement toward each other. The frames A are then in position and the lines 11 ready for use. The parts including the lines are all galvanized, and therefore will not rust from exposure to the weather. The lines once secured will last indefinitely, and any variation in the tension may be remedied by the turnbuckles 8 or the hand-nuts 12.

Having thus described my invention, what I claim as new, and desire to secure by Letters Patent, is—

A clothes-line-supporting frame, consisting of two oppositely-disposed tubular frames, each consisting of a horizontal tubular bar, the ends of which are threaded and receive elbows; vertical tubular standards threadedly connected to said elbows, anchor-plates at the ends of said vertical tubular standards, a plurality of horizontally-disposed holes arranged at predetermined distances apart in said horizontal tubular bars, threaded eyebolts fitting loosely in said holes in each horizontal bar arranged with their eyes opposite each other, a plurality of independent wire clothes-lines rigidly secured at each end to each oppositely-disposed pair of eyebolts, a nut threaded to the threaded end of each eyebolt arranged to bear against the outsides of said horizontal bars, and means for turning said nuts to adjust the tension of each independent clothes-line, clamping-clips mounted on each of said horizontal bars, a rod pivotally bolted to each clip at one end and having its lower end threaded, a turnbuckle threaded to the threaded end of said rod, a rod threaded at one end to the opposite end of said turnbuckle and an anchor-plate at the opposite end of said rod, substantially as described.

In testimony whereof I affix my signature in presence of two witnesses.

JAMES B. JACKSON.

Witnesses:
G. SARGENT ELLIOTT,
OLIVER C. PATTON.